US008631571B2

(12) United States Patent
Patel et al.

(10) Patent No.: US 8,631,571 B2
(45) Date of Patent: Jan. 21, 2014

(54) METHOD OF INSTALLING A HIGH ALTITUDE, HIGH VOLTAGE TERMINAL BLOCK ASSEMBLY

(71) Applicant: Hamilton Sundstrand Corporation, Windsor Locks, CT (US)

(72) Inventors: Dhaval Patel, Loves Park, IL (US); Alan D. Hanson, Winnebago, IL (US); Laurence D. Vanek, Janesville, WI (US); Luke Wagner, Rockford, IL (US); Glenn C. Lemmers, Jr., Loves Park, IL (US); Gordon W. Friske, Rockford, IL (US); Nathan A. Berry, Rockford, IL (US); Edward C. Allen, Davis, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/653,734

(22) Filed: Oct. 17, 2012

(65) Prior Publication Data

US 2013/0036602 A1 Feb. 14, 2013

Related U.S. Application Data

(62) Division of application No. 13/010,874, filed on Jan. 21, 2011, now Pat. No. 8,313,351.

(51) Int. Cl.
*H01R 43/20* (2006.01)
(52) U.S. Cl.
USPC ............... 29/876; 29/469; 29/525.01; 29/825
(58) Field of Classification Search
USPC ............. 29/876, 464, 469, 525.01, 596, 825; 307/116, 139; 439/34, 49, 564, 596, 439/606, 651, 709, 718, 722, 801, 874
See application file for complete search history.

(56) References Cited

U.S. PATENT DOCUMENTS

| 2,507,242 | A | 5/1950 | Bost |
| 4,835,650 | A | 5/1989 | Epstein |
| 5,169,338 | A | 12/1992 | Dewar et al. |
| 5,413,500 | A | 5/1995 | Tanaka |
| 5,791,936 | A | 8/1998 | Nicholson |
| 5,989,073 | A | 11/1999 | Kahoun |
| 6,262,497 | B1 * | 7/2001 | Muroi et al. ................. 307/139 |
| 6,291,878 | B1 | 9/2001 | Anderson et al. |
| 6,576,838 | B2 | 6/2003 | Matsumura |
| 6,897,584 | B2 * | 5/2005 | Doherty et al. ................. 310/71 |

(Continued)

OTHER PUBLICATIONS

U.S. Appl. No. 12/872,072, filed Aug. 31, 2010, "Terminal Block Cover With Nut Retention Feature".

*Primary Examiner* — Thiem Phan
(74) *Attorney, Agent, or Firm* — Carlson, Gaskey & Olds, P.C.

(57) ABSTRACT

A method of installing the terminal block assembly onto a generator includes the step of providing a terminal block with multiple terminal studs. Protrusions that are integral with the terminal block are aligned with corresponding bores in a generator housing. The terminal block is mounted on the generator housing with the protrusions received in the bores. A terminal lead assembly is inserted through the protrusion, and a terminal pad of the terminal lead assembly is arranged over the terminal stud. A terminal lug is fastened to the terminal stud. A terminal cover is secured to the terminal block over the terminal with a boss of the terminal block received in a corresponding recess of the terminal cover.

5 Claims, 5 Drawing Sheets

(56) References Cited

U.S. PATENT DOCUMENTS

| | | |
|---|---|---|
| 7,097,502 B2 | 8/2006 | Landis et al. |
| 7,288,866 B2 | 10/2007 | Kuribayashi et al. |
| 7,310,573 B2 | 12/2007 | Stickling |
| 7,472,547 B2 | 1/2009 | Grosskopf et al. |
| 7,950,969 B1 | 5/2011 | Savant |
| 2008/0197726 A1 | 8/2008 | Dubuc et al. |
| 2008/0311763 A1 | 12/2008 | Dubuc et al. |
| 2010/0054005 A1 | 3/2010 | Grosskopf et al. |
| 2011/0124240 A1 | 5/2011 | Savant |
| 2012/0049672 A1 | 3/2012 | Grosskopf et al. |
| 2012/0133224 A1 | 5/2012 | Grosskopf et al. |

* cited by examiner

METHOD OF INSTALLING A HIGH ALTITUDE, HIGH VOLTAGE TERMINAL BLOCK ASSEMBLY

This application is a divisional application of U.S. application Ser. No. 13/010,874, which was filed on Jan. 21, 2011.

BACKGROUND

This disclosure relates to a terminal block assembly, and more particularly, to a terminal block assembly for use on a gas turbine engine generator.

In gas turbine engine generator applications, a terminal block assembly provides a connection between the phase leads and the generator stator. The terminal block assembly is used to protect the phase terminals from arcing from the terminal leads and adjacent conducting surfaces. The terminal block assembly is also used to protect the phase terminals from foreign object debris that could cause electrical shorting.

Additionally, the terminal block assembly must maintain operating electrical integrity during lightning strikes, which may occur at high operational altitude. Thus, the terminal block assembly must withstand significant voltages at high altitude conditions.

SUMMARY

A terminal block assembly for a generator includes a terminal block having a base with first and second opposing sides. The first side supports multiple terminal studs. Multiple protrusions extend from and are integral with the second side. A terminal lead extends through each protrusion to the first side. Terminal pads are provided on the first side with each terminal pad electrically interconnected to one of the terminal leads and received by one of the terminal studs.

A terminal lead assembly includes the terminal lead and the terminal pad. The terminal lead extends in a first direction between first and second ends, and the terminal pad extends in a second direction and includes an aperture receiving the first end. The first and second directions are normal to one another. The terminal pad has a perimeter circumscribing the first end and is without an apex, for example, an oval shape.

A terminal cover for use with the terminal block includes a lateral wall adjoining first and second side walls. An outer wall adjoins the lateral wall and first and second side walls to provide a cavity. The walls are integral with one another. Each of the first and second side walls provide a base with a recess configured to receive structure from the terminal block. At least one hole extends through each base to the recess to facilitate in securing the cover over the terminal block.

A method of installing the terminal block assembly onto a generator includes the step of providing a terminal block with multiple terminal studs. Protrusions that are integral with the terminal block are aligned with corresponding bores in a generator housing. The terminal block is mounted on the generator housing with the protrusions received in the bores. A terminal lead assembly is inserted through the protrusion and a terminal pad of the terminal lead assembly is arranged over the terminal stud. A terminal lug is fastened to the terminal stud. A terminal cover is secured to the terminal block over the terminal with a boss of the terminal block received in a corresponding recess of the terminal cover.

BRIEF DESCRIPTION OF THE DRAWINGS

The disclosure can be further understood by reference to the following detailed description when considered in connection with the accompanying drawings wherein.

DETAILED DESCRIPTION

Figure 1:
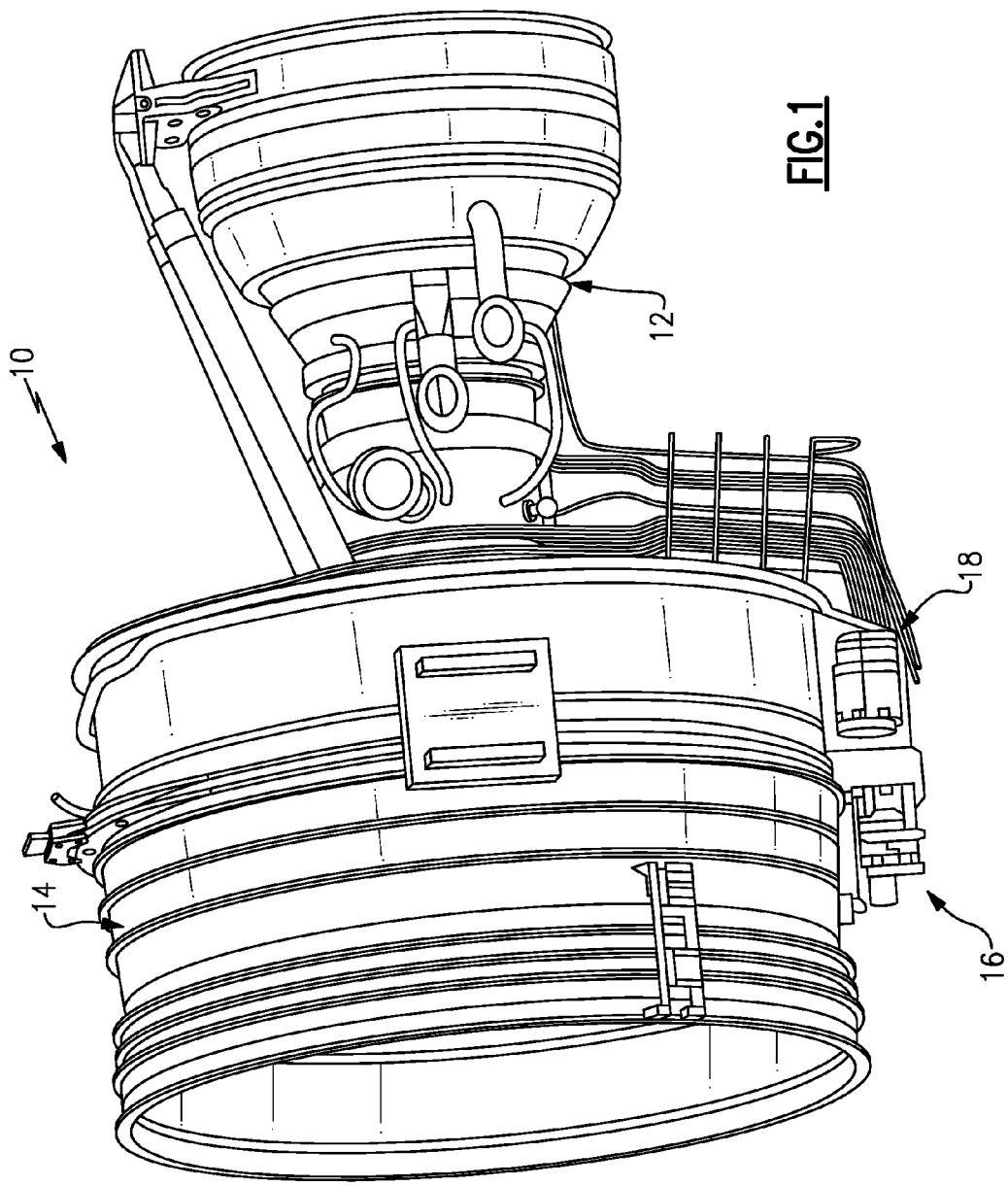
FIG. 1 is a perspective view of an example gas turbine engine.

An example gas turbine engine 10 is illustrated in FIG. 1. The gas turbine engine 10 includes a core 12 supported relative to a fan case 14 in a high bypass configuration. One or more generators 16, 18 are supported on the engine 10.

Figure 2:
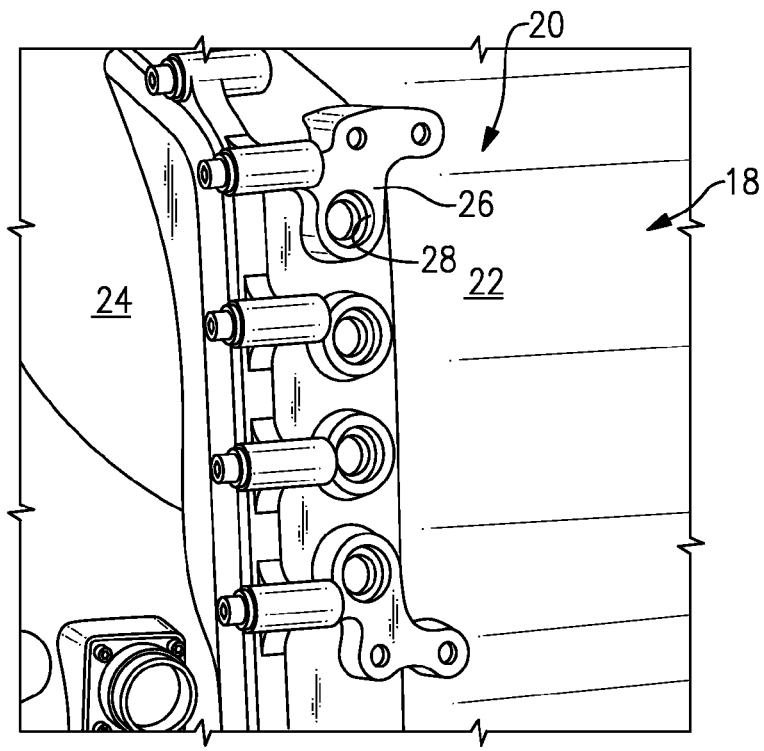
FIG. 2 is an enlarged perspective view of a portion of a generator housing.
Figure 3:
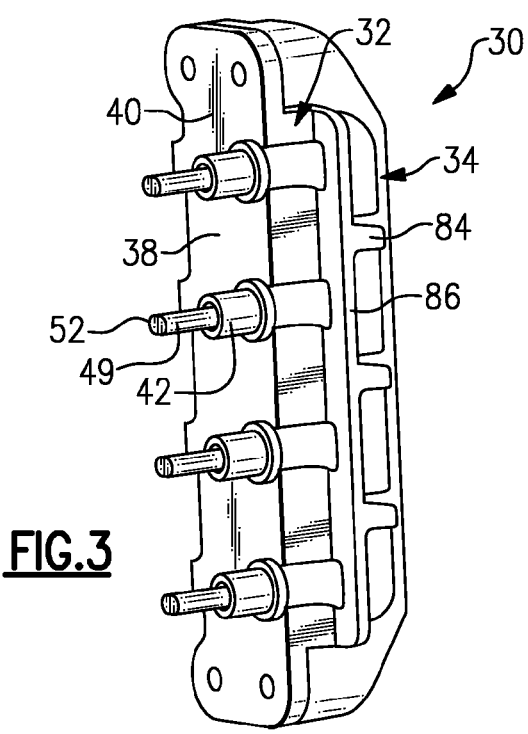
FIG. 3 is a bottom perspective view of a terminal block and cover assembly.

Referring to FIG. 2, the generator 18 includes a housing 20, which includes first and second housing portions 22, 24 secured to one another to enclose a stator, rotor and/or gearbox. One of the housing portions includes a mounting surface 26 providing multiple bores 28, which provide access for electrical penetrations provided by a terminal block assembly 30, which is illustrated in FIG. 3.

Figure 4:
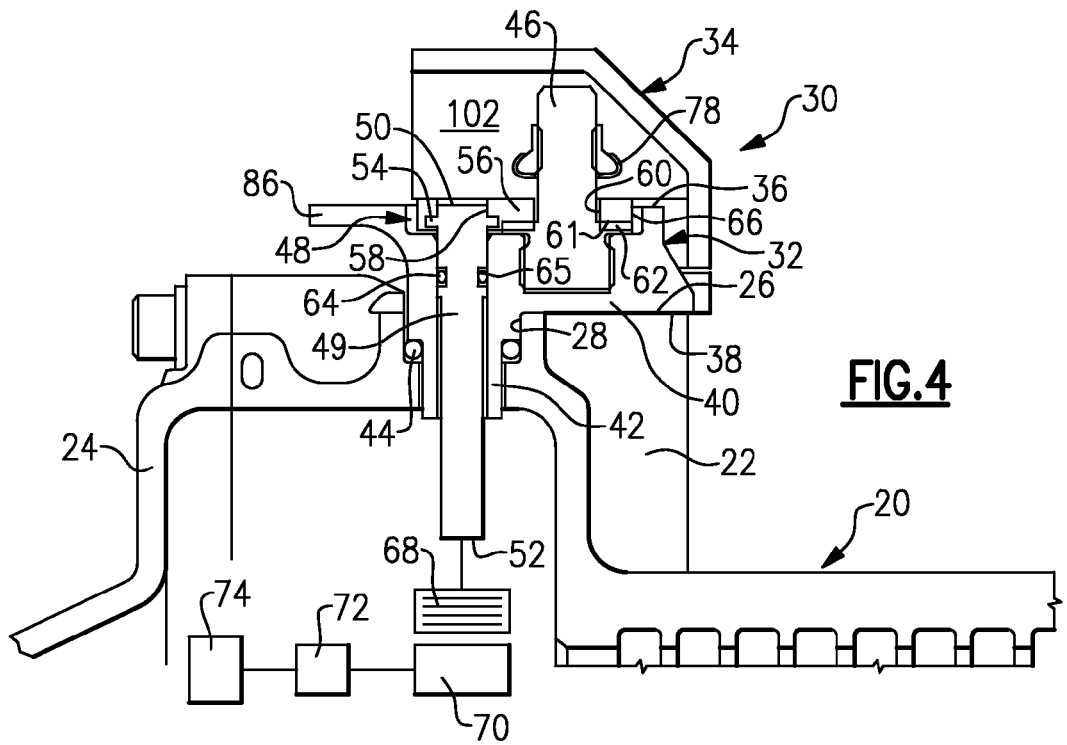
FIG. 4 is a cross-sectional view of the terminal block assembly mounted on the generator housing.
Figure 5:
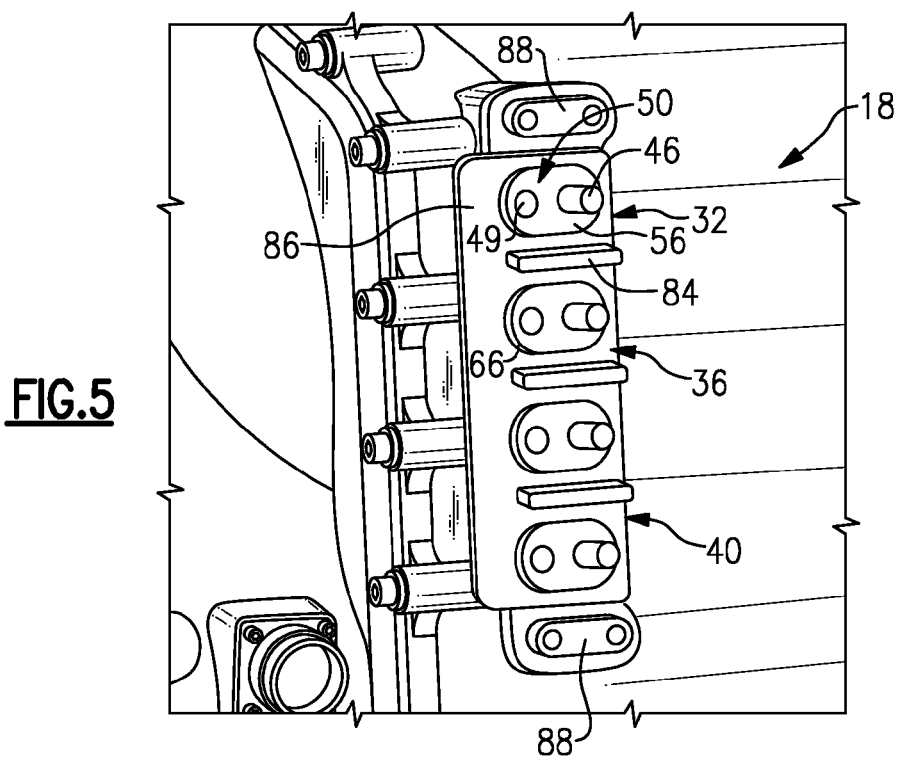
FIG. 5 is a top perspective view of a terminal block mounted on the generator housing.

The terminal block assembly 30 includes a generally rectangular terminal block 32 to which access is provided by a removable cover 34. The terminal block 32 and cover 34 are constructed from a non-conductive material. Referring to FIGS. 3-5, the terminal block 32 includes first and second opposing sides 36, 38 provided by a base 40. Integral protrusions 42 extend from the second side and are received in the bores 28 when in the installed position (FIG. 4). Four protrusions are provided for a 3-phase generator with neutral. A seal 44 is provided between each protrusion 42, which is cylindrical for example, and the housing portion 22.

Terminal studs (four for a 3-phase generator with neutral) 46 are mounted to the first side 36. The terminal studs 46 include a first end embedded into the base 40 and a second end, which is threaded. A terminal lead assembly 48 includes a generally cylindrical terminal lead 49 extending between first and second ends 50, 52. The terminal lead 49 extends from the first side 36 through the protrusion 42 in a first direction, which is parallel with the terminal stud 46. The terminal lead 49 includes an annular groove 65 that receives a seal 64 provided between the terminal lead 49 and the base 40.

The terminal lead assembly 48 also includes a pad 56 having first and second spaced apart apertures 58, 60. The first end 50 includes an annular flange 54 that abuts the pad 56 with the first end 50 received in the first aperture 58. The terminal lead 49 is brazed to the pad 56 in one example. The pad 56 is oriented in a direction normal to the terminal lead.

The terminal stud 46 includes a shoulder 62. A recess 61, which is a spot-face machined for example, circumscribes the second aperture 60 and is provided on the same side from which the terminal lead 49 extends from the pad 56. The shoulder 62 is received in the recess 61 with the terminal lead assembly 48 in the installed position, which eliminates the need for a washer.

The pad 56 includes a perimeter 66, best shown in FIG. 5, that encircles both the first and second apertures 58, 60 in the example shown. The perimeter 66 has a smooth contour without any apexes, and is oval in shape in the example illustrated.

The terminal lead assemblies 48 provide connections with a stator 68 (FIG. 4), which supplies current to the terminal studs 46 in response to rotation of a rotor 70. The rotors 70 are coupled to a spool 74 through a gearbox 72 in one example.

Figure 6:
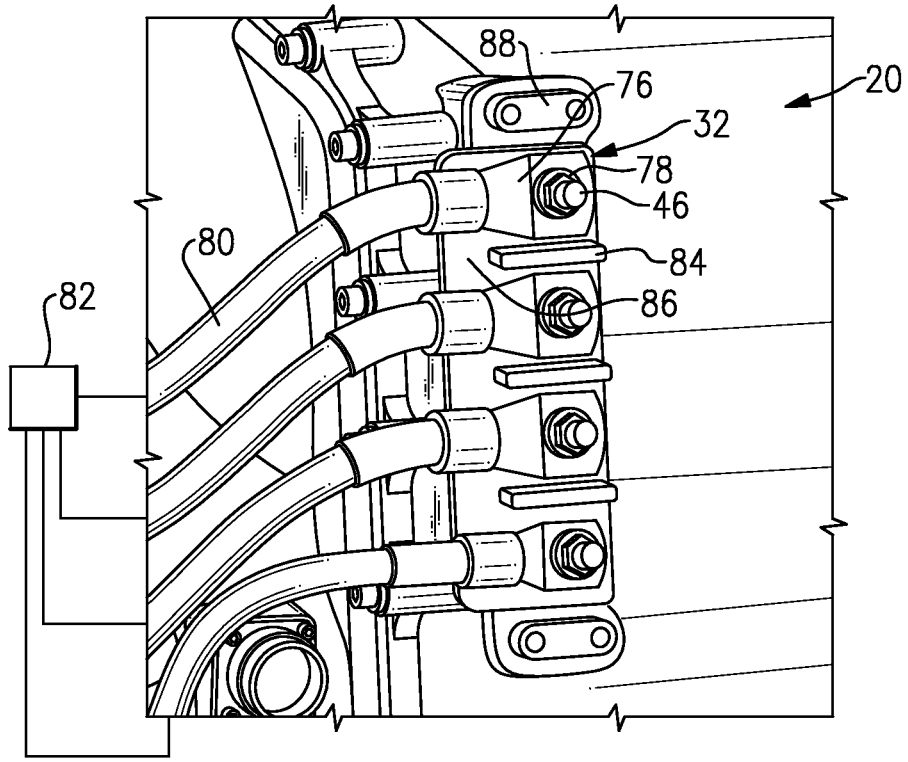
FIG. 6 is a top perspective view of the terminal block illustrated in FIG. 5 with lugs secured thereto.

Referring to FIGS. 5 and 6, lugs 76 are installed onto the terminal studs 46 and secured thereto by a nut 78. Wires 80 from the lugs 76 are connected to an electrical component 82. Projections 84 extending from the first side 36 of the base 40 separate the lugs 76 from one another. A shelf 86 extends from a long side of the base 40 generally along a plane, which provides the first side 36 in the example, that is perpendicular to the terminal studs 46 and between the lugs 76 and the housing 20 to further ensure against undesired arcing or electrical shorts.

The base 40 includes oblong or oval bosses 88 extending from the first side 36, which cooperate with corresponding recesses 104 (FIG. 7) in the cover 34 to locate the cover 34 relative to the terminal block 32. This feature lengthens the path through air from the terminal lead 49 and the mounting screw head, which increases the clearance path. The oval bosses 88 also provide a longer creepage path from the mount screw and the terminal lead 49, which makes the path more foreign object debris-tolerant.

Figure 7:
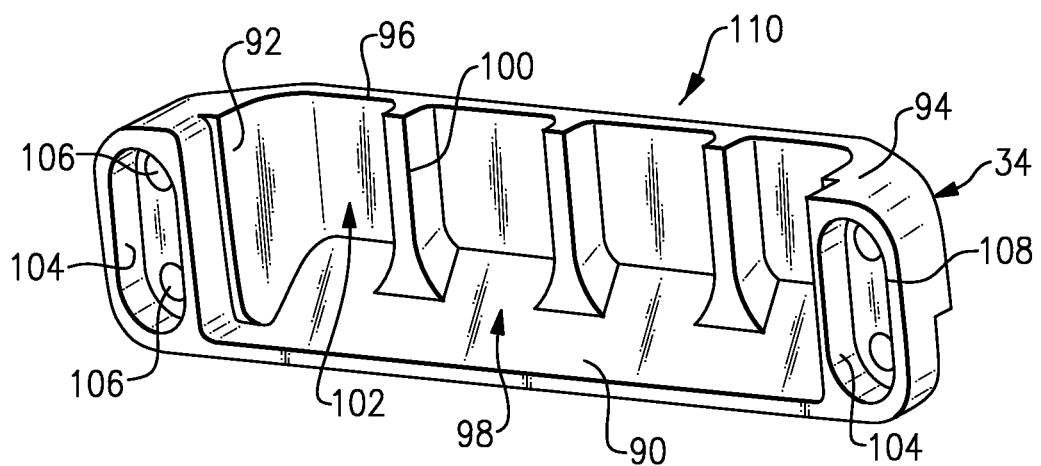
FIG. 7 is a bottom perspective view of a terminal cover.

Referring to FIG. 7, the cover 34 includes a lateral wall 90 extending between and integral with first and second side walls 92, 94. An outer wall 96 adjoins the lateral wall 90 and the first and side walls 92, 94. The walls are integrally formed with one another to provide a cavity 98. Partition walls 100 extend from the outer wall 96 and the lateral wall 90 to provide four pockets 102 that correspondingly enclose the lugs 76 when in the installed position to insulate the lugs 76 from one another.

Figure 8:
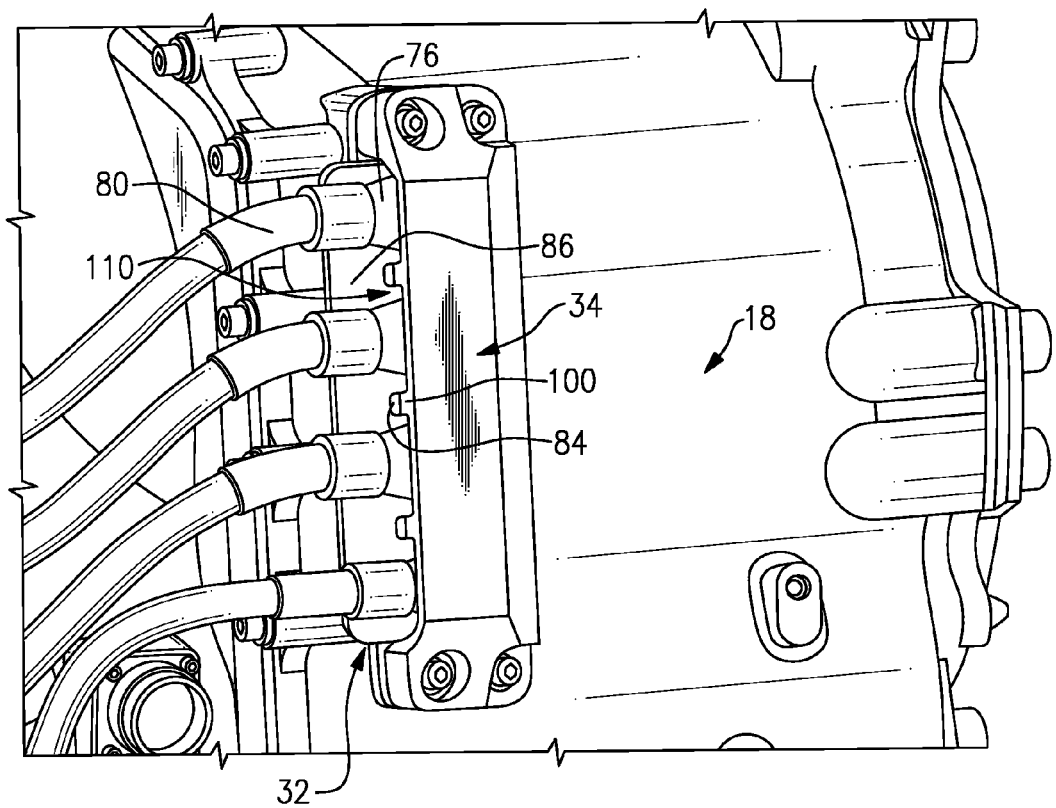
FIG. 8 is a top perspective view of the terminal block assembly mounted on the generator housing with lugs secured thereto.

Each recess 104 includes a pair of holes 106 that are provided in a base 108 of the side walls 92, 94. Referring to FIG. 8, fasteners secure the cover 34 to the terminal block 32 and the housing 20. The cover 34 provides an open side 110 to which the wires 80 extend.

Although an example embodiment has been disclosed, a worker of ordinary skill in this art would recognize that certain modifications would come within the scope of the claims. For that reason, the following claims should be studied to determine their true scope and content.

What is claimed is:

1. A method of installing a terminal block assembly onto a generator comprising:
   providing a terminal block with multiple terminal studs;
   aligning protrusions that are integral with the terminal block with corresponding bores in a generator housing;
   mounting the terminal block on the generator housing with the protrusions received in the bores;
   inserting a terminal lead assembly through the protrusion with a terminal pad of the terminal lead assembly arranged over the terminal stud;
   fastening a terminal lug to the terminal stud; and
   securing a terminal cover to the terminal block over the terminal lug with a boss of the terminal block received in a corresponding recess of the terminal cover with fasteners securing the boss relative to the recess.

2. The method according to claim 1, wherein the terminal block includes a base having first and second opposing sides, the first side supporting the multiple terminal studs, the protrusions on the second side, the boss on the first side.

3. The method according to claim 2, wherein the base includes a boss extending upward from the first side and including at least one hole, the boss configured to locate the terminal cover.

4. The method according to claim 1, comprising the step of providing a shelf extending from the terminal block beneath the terminal lug and arranged between the terminal lug and the generator housing.

5. The method according to claim 1, comprising the step of providing a seal between the protrusion and the housing within the bore.

* * * * *